Patented Feb. 27, 1934

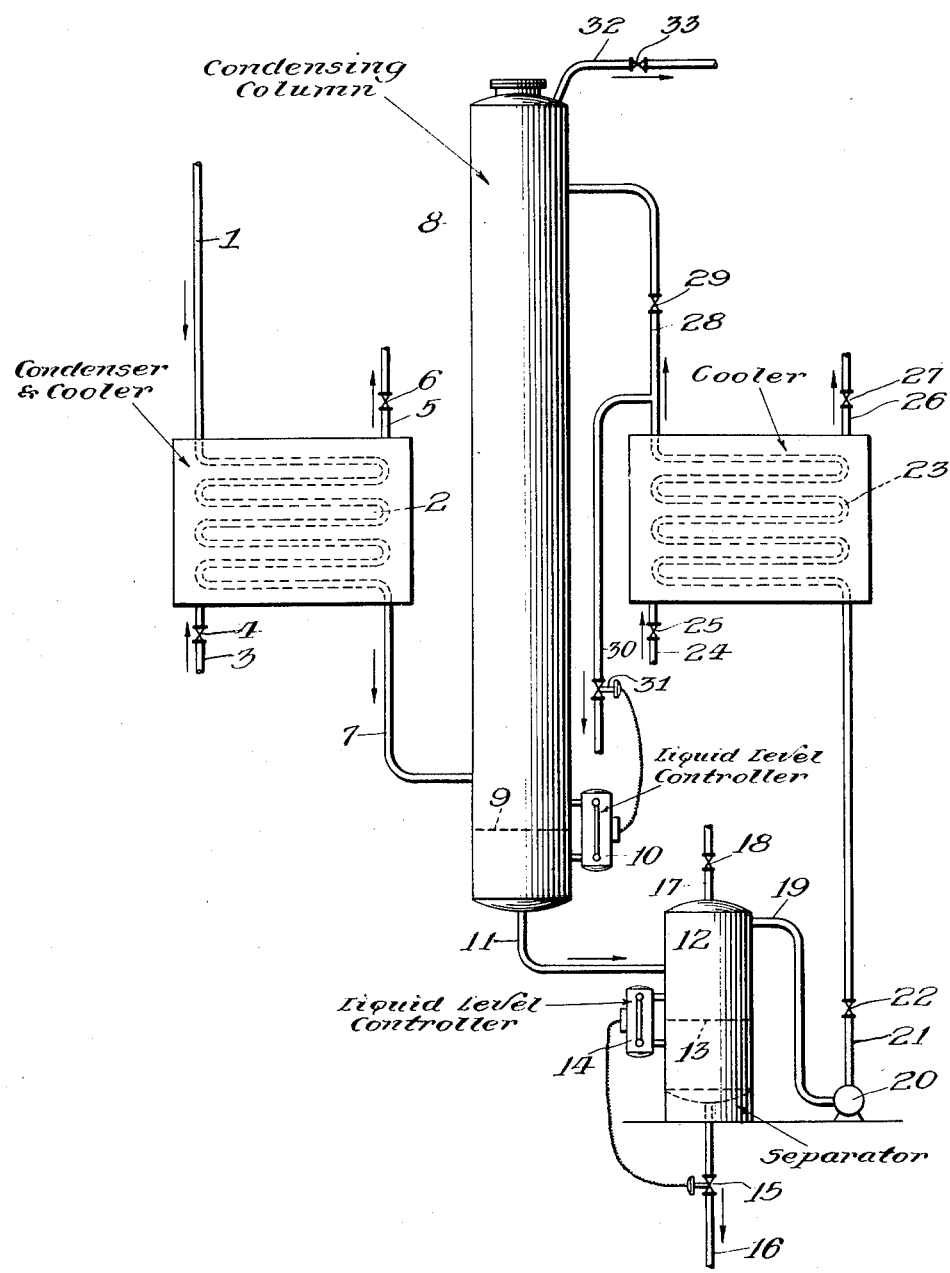

1,948,595

UNITED STATES PATENT OFFICE 1,948,595

TREATMENT OF VAPOR-GAS MIXTURES

Robert Pyzel, Chicago, Ill., assignor to Universal Oil Products Company, Chicago, Ill., a corporation of Delaware Application March 30, 1933. Serial No. 663,439

2 Claims. (Cl. 196—140)

This invention particularly refers to an improved process and apparatus for the treatment of mixtures of vapors and gases whereby substantially all of the desired liquefiable components of the mixture are condensed and recovered.

The invention is particularly well adapted to the treatment of a mixture of combustion gases, hydrocarbon oil vapors and gases and steam such as encountered in several of my previous disclosed processes for the pyrolytic conversion of hydrocarbon oils. It will be readily understood, however, that the invention is not limited to the treatment of a mixture of the specific materials mentioned, although such a mixture will form the basis for further description and explanation of the present invention. The features of the present invention are adaptable to the treatment, for the purpose mentioned, of practically all vapor-gas mixtures of the type wherein condensables may be recovered from the mixture by cooling and fractionation and such mixtures may contain two or more classes of condensable materials as well as two or more classes of fixed or substantially incondensable gases, particularly when the two classes of condensables may be separated after condensation by stratification, in case their separation is desired, as in the case of hydrocarbon oil and water.

The accompanying diagrammatic drawing illustrates one specific form of apparatus embodying the features of the present invention and the following description of the drawing includes a description of the operation of the process for the treatment of a mixture of combustion gas, steam and hydrocarbon gases and vapors as it may be practiced in the specific form of apparatus shown.

The vapor-gas mixture to be treated enters the system in heated state from any suitable source, such as the fractionator of a cracking system, through line 1 and passes first through condenser and cooler 2, which may be of any suitable form such as an open tank with submerged cooling coil or a heat exchanger of any conventional design, suitable cooling medium such as water being circulated therethrough by means of lines 3 and 5 controlled by valves 4 and 6, respectively. Condensation of a large portion of the steam and hydrocarbon oil vapors is accomplished in condenser and cooler 2 and the resulting water, distillate and uncondensed gases and vapors pass through line 7 into the condensing or fractionating column 8.

Column 8 preferably contains suitable well known means such as packing, perforated pans, bubble trays or the like, not shown in the drawing, for obtaining direct and intimate contact between the uncondensed vapors and gases flowing upward through the tower and a direct contact cooling medium, which will be later more fully described, flowing counter-current to the stream of uncondensed vapors and gases. Condensate including hydrocarbon oil distillate and water condensed in condenser and cooler 2 and in column 8, separates from the uncondensed gases and collects within the lower portion of column 8 wherein a suitable liquid level, indicated at 9, is maintained by means of liquid level control 10, as will be later more fully described.

The hydrocarbon oil distillate and water pass from the lower portion of column 8 through line 11 into separator 12 wherein they stratify, the water collecting within the lower portion of the separator while the hydrocarbon oil distillate collects within its upper portion, the line between the strata, indicated at 13, being maintained at the desired level by means of a suitable liquid level controller 14 actuating valve 15, in line 16, through which the water is removed from separator 12.

Separator 12 is provided with a vent 17 having a suitable check or pop-valve 18 through which any incidental gases or vapors collected in separator 12 may be released.

The hydrocarbon distillate is withdrawn from the upper portion of the separator 12 through line 19 to pump 20 by means of which it is fed through line 21 and valve 22 to cooler 23 of any suitable form, through which a suitable cooling or refrigerating medium is passed in indirect contact with the distillate by means of lines 24 and 26 controlled by valves 25 and 27, respectively, in order to cool the distillate to substantially atmospheric or to the desired sub-atmospheric temperature. Any desired quantity of the distillate cooled in cooler 23 is returned through line 28 and valve 29 to the upper portion of column 8, coming into direct and counter-current contact in this zone with the uncondensed vapors and gases, serving as a cooling, absorbing and refluxing medium to effect condensation of substantially all of the liquefiable components in the vapor gas mixture. The excess of cooled distillate not required as condensing and refluxing medium in column 8 and representing the final distillate product of the process is withdrawn to storage or elsewhere, as desired, through line 30 and valve 31. Valve 31 is actuated by the liquid level controller 10, serving to maintain the liquid level 9 in column 8 at the desired height, thereby automatically controlling the proportion of the total cooled distillate recirculated to column 8.

Uncondensed gases including combustion gases and fixed hydrocarbon gases as well as any condensable hydrocarbons still entrained in the gases, are released from the upper portion of column 8 through line 32 and valve 33, preferably passing to suitable absorption equipment, not shown in the drawing, for the recovery of substantially all the desirable remaining liquefiable hydrocarbons.

It is desired to call particular attention to the fact that only hydrocarbon oil distillate recovered from within the system is recirculated as a cooling and refluxing medium in the condensing column instead of recirculating an absorber oil from some external source or a mixture of distillate and water direct from the condensing column, a substantially complete separation of distillate and water being effected in the present invention. I have found this separating step particularly desirable and in many cases essential to the successful operation of the process for the following reason. By the present method the danger of forming permanent emulsions in the condensing column is eliminated. I have also found that the distillate is a better absorbing medium than water or mixtures of distillate and water for the desirable light condensable hydrocarbons in the vapor-gas mixture. By complete separation of the distillate and water, prior to final cooling and removal of the distillate to storage, I obviate passing a mixture of distillate and water to storage, thereby eliminating trouble, due to freezing of the lines following the coolers during cold weather. Due to the large quantity of distillate ordinarily required for recirculation pumps of the centrifugal type are most suitable for this service but such pumps handling a mixture of distillate and water tend to form emulsions which give difficulty in securing final separation of the products. Obviously, this difficulty is eliminated by separation, prior to recirculation.

As a specific example of the operation of the process of the present invention as it may be practiced in the apparatus illustrated and above described, the material to be treated comprises a mixture of gases consisting principally of carbon dioxide, nitrogen and steam resulting from combustion of a hydrocarbon fuel, additional steam which has been added to the combustion gases, fixed hydrocarbon gases and condensable hydrocarbon vapors of approximate gasoline boiling range resulting from the conversion of hydrocarbon oil. This mixture is obtained from the fractionator of a cracking system at a temperature of approximately 375° F., and passes through a heat exchanger in indirect contact with raw oil charging stock for the cracking process whereby the mixture is cooled to a temperature of about 170° F., at which temperature the products enter the condensing column, from the lower portion of which a mixture of distillate and water is withdrawn at a temperature of about 150° F., to a separator. Water is withdrawn from the separator and a portion of it preferably flashed to steam by a reduction in pressure, is utilized to cool the combustion products in the combustion zone of the cracking system, prior to their mixture with hydrocarbon oil. Distillate separately withdrawn from the separator is cooled to a temperature of about 60° F., and a sufficient quantity of the cooled distillate is recirculated to the upper portion of the fractionating or condensing column to maintain an outlet temperature of about 70° F., from the upper portion of this zone. Uncondensed gases pass from the upper portion of the fractionator to suitable absorption equipment. Neglecting drop in pressure, due to friction and loss of pressure head through the system and the increased pressure on the distillate recirculated, a substantially equalized pressure of about 100 pounds per square inch is maintained on the entire system. By this method only about 12 to 15% of the desired liquefiable hydrocarbons remains entrained in the gases for recovery by absorption as compared with about 30% or more of this material left in the gases when the features of the invention are not utilized. This obviously greatly decreases the required capacity of the absorption or scrubbing equipment.

I claim as my invention:

1. A process for the treatment of heated vapor-gas mixtures containing fixed gases, condensable hydrocarbon vapors and steam to effect their separation, which comprises subjecting the heated mixture to condensation by indirect contact with a cooling medium whereby a portion of the hydrocarbon oil vapors and steam is condensed, then passing the mixture into a direct contact condensing column wherein an additional portion of the remaining liquefiable components of the mixture are condensed, withdrawing oil distillate and water from the condensing column to a separator wherein they are separated by stratification, removing water from the system, subjecting oil distillate from the separator to further cooling, returning a regulated portion thereof to the condensing column as a cooling and refluxing medium, withdrawing the remainder from the system and removing uncondensed gases from the upper portion of the condensing column.

2. In processes of the character wherein hydrocarbon oils are subjected to cracking conditions by direct contact with hot products of combustion, comprising steam and fixed gases to produce a mixture of cracked hydrocarbon oil vapors, fixed gases comprising hydrocarbon gases, combustion gases and steam the improvement which comprises subjecting the said mixture to condensation by indirect contact with a cooling medium whereby a portion of the hydrocarbon oil vapors and steam is condensed, then passing the mixture into a direct contact condensing column wherein an additional portion of the remaining liquefiable components of the mixture are condensed, withdrawing oil distillate and water from the condensing column to a separator wherein they are separated by stratification, removing water from the system, subjecting oil distillate from the separator to further cooling, returning a regulated portion thereof to the condensing column as a cooling and refluxing medium, withdrawing the remainder from the system and removing uncondensed gases from the upper portion of the condensing column.

ROBERT PYZEL.